3,344,101
ASPHALT-COPOLYMER PAPER LAMINATING COMPOSITION
Joseph C. Roediger, Westfield, N.J., assignor to Esso Research and Engineering Company, a corporation of Delaware
No Drawing. Filed July 11, 1963, Ser. No. 294,235
3 Claims. (Cl. 260—28.5)

This invention concerns an improved laminating composition and, more particularly, an asphalt composition containing a high molecular weight copolymer.

Asphalts have been used as paper laminants. The laminated paper has been used to make bags for cement, fertilizer, animal feeds, machinery and the like. Moreover, asphalt laminated paper is often used in place of polyethylene and tarpaulins to protect materials stored out-of-doors from water. The asphalt, under certain conditions, has been effective in decreasing the moisture vapor transmission rate of the laminated paper. If, however, at low temperatures the laminated paper is handled roughly, for example, formed into bags or subjected to strong winds when used for outdoor protection over piles of materials, the paper is often delaminated due to the relatively brittle nature of the asphalt laminant. The delamination, of course, causes a serious increase in the moisture vapor transmission rate of the paper, thus decreasing the protection given by the paper.

It has now been discovered that the delaminating of the paper can be prevented by using an asphalt containing minor amounts of certain high molecular weight copolymers.

The copolymers of this invention are copolymers of ethylene and a vinyl ester of a short chain fatty acid having from 2 to 5 carbon atoms. The preferred vinyl ester is vinyl acetate. The copolymer should contain from 50 to 99 wt. percent of ethylene and from 1 to 50 wt. percent of the vinyl ester. The copolymers preferably contain from 67 to 72 wt. percent of ethylene and from 28 to 33 wt. percent of the vinyl ester.

A particularly desirable copolymer is one of ethylene-vinyl acetate having the following characteristics:

TABLE I (1) Inherent viscosity at 30° C. (0.25% by weight in toluene) _____ 0.85
(2) Comonomer ratio, wt. percent ethylene/vinyl acetate _____ 72/28
(3) Melt index (ASTM D1238–57T) _____ 15
(4) Tensile strength, p.s.i. _____ 2000
(5) Elongation at break, percent _____ >50
(6) Density, g./cc. at 30° C. _____ 0.95
(7) Refractive index, $n_d^{2.5}$ _____ 1.482
(8) Softening point, ring and ball, °F. _____ 276

Asphalts, including air refined (oxidized) asphalt, are suitable as the basic ingredient of the laminating composition. An asphalt of good low temperature flexibility is best selected from those asphalts having a ball and ring softening point within the range of from 150 to 210° F.

The laminating composition should contain from 90 to 97.5 wt. percent of asphalt and from 2.5 to 10 wt. percent of the ethylene-vinyl ester copolymer. A preferred composition contains from 95.0 to 97.5 wt. percent asphalt and from 2.5 to 5.0 wt. percent of the copolymer.

The above-described laminating composition is effective in preventing delamination of paper which is creased or handled roughly at cold temperatures. However, the incorporation of the copolymer in asphalt requires a relatively long mixing operation at elevated temperatures.

It has been found that the length of the mixing step can be substantially reduced by first dissolving or dispersing the copolymer in a wax. The masterbatch of wax and copolymer is then dissolved in hot asphalt with a minimum of mixing. Moreover, simple stirrers, rather than expensive sigma blade mixers, can be employed.

A wide variety of waxes are suitable for use in the masterbatch. Paraffins melting in the range of from 120 to 160° F. can be used alone or in combination with a microcrystalline wax melting in a range of from 150 to 180° F. A blend of from 80 to 99% paraffin wax and from 1 to 20 wt. percent microcrystalline wax is particularly effective. Examples of suitable waxes are presented in the following table.

TABLE II

| | Wax A | Wax B |
|---|---|---|
| Composition, wt. percent: | | |
| 150° F. Paraffin Wax | 100 | |
| 175° F. Micro Wax | | 100 |
| Kinematic Viscosity at 210° F., cs. | 5.6 | 21.1 |
| R.I. at 212° F. | 1.4282 | 1.447 |
| Congealing Point, °F. | 151 | 163 |
| Characterization | Paraffin | Micro |
| ASTM Melting Point, °F. | 150 | 175 |
| Petrolatum Melting Point, °F. | | |

The masterbatch contains from 40 to 80 wt. percent wax and from 20 to 60 wt. percent of the copolymer. Satisfactory blending with asphalt is obtained by using a masterbatch containing as little as 40% wax. Blends with less wax can lead to mixing problems in certain types of tankage. It is preferred that the masterbatch contains from 60 to 75% wax.

The copolymer is easily dispersed in the wax at elevated temperatures which may be as high as 500° F.; however, it is preferred that the blending be performed at temperatures above the melting point of the wax but below about 400° F. due to the fact that the copolymer starts to be degraded above that temperature.

The masterbatch is then dissolved or dispersed in hot asphalt at a temperature of from 300 to 375° F. A minimum amount of stirring is necessary.

The laminating compound prepared with the wax-copolymer masterbatch contains from 80 to 95 wt. percent asphalt and from 5 to 20 wt. percent of the masterbatch.

In order to demonstrate the efficacy of this invention, the following compositions were prepared:

The copolymer described in Table I was prepared by reacting ethylene with vinyl acetate in a weight ratio of 72/28.

*Masterbatch 1*

A masterbatch of 75 wt. percent of Wax A described in Table II and 25 wt. percent of the copolymer described in Table I was prepared.

*Masterbatch 2*

This composition consisted of 65% of Wax A described in Table II, 25% of the copolymer described in Table I, and 10% of a microwax (Wax B described in Table II).

*Masterbatch 3*

The composition consisted of 50% Wax A and 50% of the copolymer described in Table I.

*Example.*—Each masterbatch was then dissolved in an air blown asphalt, having a softening point of about 180° F., at a temperature of about 400° F.

Each of the asphalt laminating compositions was then used to laminate 2 pieces of 30# kraft paper; the total thickness of the laminated paper was about 6 to 8 mils.

In order to test the resistance of the laminant to brittle fracture when the laminated paper is subjected to rough treatment at low temperatures, the laminated paper was creased at 35° F. in accordance with TAPPI method T465 SM–52. In order to test the extent and severity of the crease line fracture, the MVTR of each creased laminated paper was determined by TAPPI method 448m-49. The results of the test appear in Table III.

TABLE III

| Percent of Masterbatch Added to Asphalt | Percent Copolymer in Laminant | MVTR ᵃ (grams of moisture/sq. meter/25 hours) | |
|---|---|---|---|
| | | Uncreased | Creased |
| 0 | 0 | 2.9 | 9.7 |
| 10% Masterbatch 1 | 2.5 | 3.3 | 6.6 |
| 15% Masterbatch 1 | 3.8 | | 3.3 |
| 10% Masterbatch 2 | 2.5 | | 1.6 |
| 15% Masterbatch 2 | 3.8 | | 2.9 |
| 5% Masterbatch 3 | 2.5 | | 2.3 |
| 10% Masterbatch 3 | 5.0 | 3.4 | 3.1 |

ᵃ At 77° F.—50% R.H.

The above data show that the straight asphalt is effective in promoting a low MVTR for an uncreased paper. However, unsatisfactory results were obtained for the creased paper. This indicates that the straight asphalt will delaminate or fracture if the laminated paper is subjected to rough handling at low temperatures.

In contrast, the laminating compositions containing the ethylene-vinyl acetate copolymer were effective in giving a low MVTR to the creased samples. This indicates that paper laminated with an asphalt composition containing the copolymers of this invention will not be delaminated by rough handling at low temperatures.

The compositions of this invention are an effective laminant for a wide variety of types of paper. It is particularly effective for laminating kraft paper weighing from 15 to 60 pounds per ream. The compositions may also be used to laminate thin metallic foils to paper or to laminate paper to a roofing material such as an asphalt saturated felt.

The amount of laminant required will vary depending upon the materials laminated; but, in general, from 30 to 200 pounds of laminant should be used per ream of paper. This corresponds to 3000 square feet of laminated surface area. For bag stock, an amount of from 130 to 160 pounds of laminant per ream is employed.

What is claimed is:

1. A laminating composition for paper consisting essentially of a major proportion of an asphalt having a softening point of 150 to 210° F., and which tends to be brittle and to delaminate upon cracking of treated paper, and 5 to 20 wt. percent of a wax-copolymer masterbatch comprising from 40 to 80 wt. percent of a petroleum wax selected from the group consisting of paraffin wax of 120 to 160° F. melting point and blends of 80 to 99 wt. percent of said paraffin wax and 1 to 20 wt. percent of microcrystalline wax, said blends melting in the range of 150 to 180° F., and from 20 to 60 wt. percent of a copolymer capable of inhibiting said delamination upon cracking of said paper having in the range of from 50 to 99 wt. percent ethylene and from 1 to 50 wt. percent of a vinyl ester of a fatty acid having from 2 to 5 carbon atoms.

2. A laminating composition for paper consisting essentially of a major amount of an air blown asphalt having a softening point of 150 to 219° F. and which tends to be brittle and to delaminate upon cracking of treated paper; about 2.5 to 10 wt. percent, based on the total composition, of a copolymer consisting essentially of 50 to 99 wt. percent ethylene and 1 to 50 wt. percent of a vinyl ester of a fatty acid having 2 to 5 carbon atoms, said copolymer being capable of inhibiting said delamination upon creasing of said paper; and wax selected from the group consisting of paraffin wax of 120 to 160° F. melting point and blends of 80 to 99 wt. percent of said paraffin wax and 1 to 20 wt. percent of micro crystalline wax, said blends melting in the range of 150 to 180° F., and the amount of said wax being 40 to 80 wt. percent of the total weight of said wax and said copolymer.

3. A laminating composition according to claim 2, wherein said copolymer consists essentially of 67 to 72 wt. percent of ethylene and 28 to 33 wt. percent of vinyl acetate, and the amount of said copolymer is 2.5 to 5.0 wt. percent based on the weight of the total composition.

References Cited

UNITED STATES PATENTS

| 2,420,082 | 5/1947 | Klinger | 260—28.5 |
| 2,877,196 | 3/1959 | Reding | 260—28.5 |
| 3,025,167 | 3/1962 | Butler | 260—28.5 |
| 3,177,164 | 4/1965 | Mills et al. | 260—28.5 |

FOREIGN PATENTS 522,921   3/1956   Canada.

JULIUS FROME, *Primary Examiner.*

ALLAN LIEBERMAN, MORRIS LIEBERMAN,
*Examiners.*